United States Patent

Kondo et al.

[11] Patent Number: 4,618,096
[45] Date of Patent: Oct. 21, 1986

[54] WINDOW WASHER FOR VEHICLE

[75] Inventors: Yasuo Kondo; Masakane Watanabe, both of Okazaki; Takao Oshiro, Toyoake, all of Japan

[73] Assignees: Nippon Soken, Inc., Nishio; Nippondenso Co., Ltd., Kariya, both of Japan

[21] Appl. No.: 656,523

[22] Filed: Oct. 1, 1984

[30] Foreign Application Priority Data

Oct. 11, 1983 [JP] Japan ................. 58-189641

[51] Int. Cl.$^4$ .................................................. B05B 1/08
[52] U.S. Cl. ........................... 239/101; 137/624.15; 137/826; 239/332; 239/284.1; 417/410
[58] Field of Search .............. 239/284 R, 284 A, 101, 239/102, 332; 137/826, 624.15, 351, 487.5, 565; 417/45, 410

[56] References Cited

U.S. PATENT DOCUMENTS

| 2,717,556 | 9/1955 | Bartoo | 239/284 |
| 3,747,858 | 7/1973 | Krynicki | 239/101 |
| 4,052,002 | 10/1977 | Stouffer et al. | 239/102 |
| 4,157,161 | 6/1979 | Bauer | 239/284 R |
| 4,454,456 | 6/1984 | Hauser | 239/332 |

FOREIGN PATENT DOCUMENTS

| 2429643 | 1/1976 | Fed. Rep. of Germany ... 239/284 A |
| 2419195 | 11/1979 | France | 239/284 R |

Primary Examiner—Joseph F. Peters, Jr.
Assistant Examiner—Michael J. Forman
Attorney, Agent, or Firm—Cushman, Darby & Cushman

[57] ABSTRACT

A window washer comprises a washer liquid jet nozzle provided under a windshield glass of a vehicle so as to be directed thereto for periodically deflecting the jetting direction of the washer liquid horizontally by the fluidic self-oscillating operation thereof, a pump provided in a washer liquid passage connecting the jet nozzle to a washer liquid tank for pressurizing the washer liquid and sending the pressurized washer liquid, a driving motor for driving the pump and a motor control circuit for applying a square pulse shaped voltage to the motor. The motor control circuit periodically operates the pump so that the discharge pressure thereof periodically changes. Consequently, the jetting direction of the washer liquid jetted from the jet nozzle is periodically deflected horizontally and vertically.

4 Claims, 7 Drawing Figures

WINDOW WASHER FOR VEHICLE

BACKGROUND OF THE INVENTION

The present invention relates to a window washer for washing a windshield glass surface of a vehicle by blowing a washer liquid against the windshield glass surface.

The conventional window washer generally comprises a nozzle fixed to a vehicle body below the windshield glass for jetting a washer liquid in a certain direction. The washer liquid is jetted to a fixed portion of the glass surface from the nozzle and is spread over the glass surface by means of wiper blades. This conventional window washer has a problem; a high enough volume of washer liquid does not reach portions of a windshield glass surface other than that to which the washer liquid is directly jetted. Therefore, visibility through the windshield is not as great as it could be were a more uniform distribution of the washer fluid achieved.

Furthermore, the glass surface which the washer liquid does not reach is liable to be scratched by sands attached thereto while the wiper blades operate.

Recently, a window washer by which the jetting direction of the washer liquid is periodically deflected by employing a fluidic oscillator (U.S. Pat. No. 4,052,002) as a jet nozzle has been proposed. In this window washer, the washer liquid striking position on the glass surface moves horizontally along the upper side of the glass surface. Therefore, the washer liquid can be spread over a relatively wide area of the glass surface in left and right directions thereof. However, since the washer liquid only drops spontaneously downwards, it does not uniformly spread in the vertical direction of the glass surface; thus the washer liquid does not uniformly spread over the whole operating area of the wiper blades.

SUMMARY OF THE INVENTION

One object of the present invention is to provide a window washer for washing a windshield glass surface of a vehicle by blowing a washer liquid thereagainst.

Another object of the present invention is to provide a window washer by which a washer liquid film is uniformly formed over a wide range on a windshield glass surface of vehicle.

Still another object of the present invention is to provide a window washer by which the washer liquid striking position on the windshield glass is periodically moved vertically and horizontally.

The window washer of the present invention comprises a fluidic oscillator type jet nozzle provided on a vehicle body under a windshield glass for periodically deflecting the jetting direction of the washer liquid leftwards and rightwards, a washer liquid supply passage connecting a washer liquid tank to the fluidic oscillator type jet nozzle for supplying the washer liquid to the jet nozzle, and a pressure apply means provided in the washer liquid supply passage for periodically changing the pressure of the washer liquid supplied to the jet nozzle.

By periodically changing the pressure of the washer liquid by means of the pressure apply means, the striking position of the washer liquid on the windshield glass is periodically moved in the horizontal and the vertical directions. Accordingly, a uniform washer liquid film is formed over the whole operating area of the wiper blades on the windshield glass.

DETAILED DESCRIPTION OF THE PREFERRED EMBODIMENTS

Hereinafter, the present invention will be explained in detail.

Figure 1:
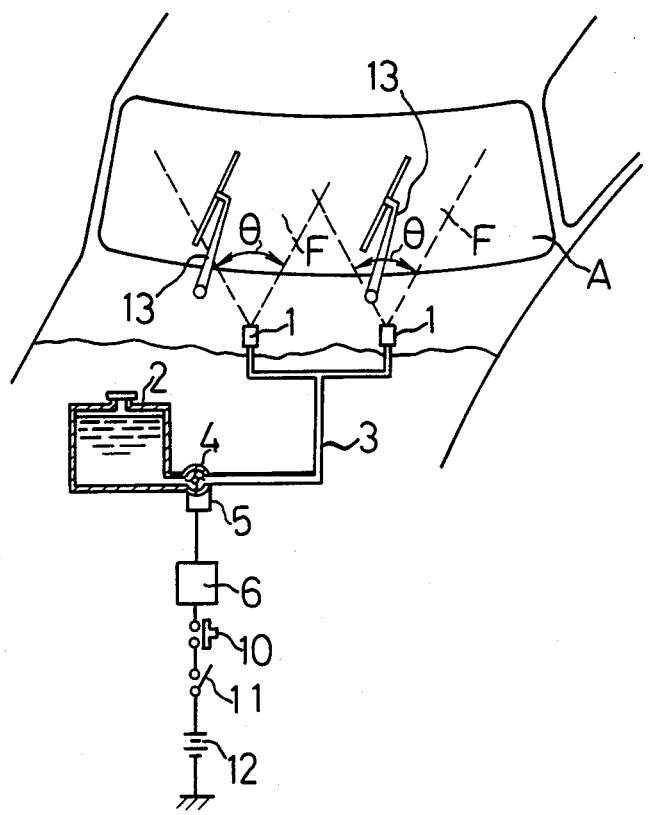
FIG. 1 is a diagrammatic illustration of a window washer according to the present invention.

In FIG. 1, a pair of jet nozzles 1 are provided in the cowl top portion of a vehicle so as to be directed to a windshield glass A.

Each of the jet nozzles 1 is a fluidic oscillator which periodically deflects a jet of a washer liquid leftwards and rightwards within a predetermined angle range $\theta$ by guiding a part of the jet back from an outlet port to an upstream side thereof so as to cause a self-oscillating operation of the washer liquid.

A washer liquid supply pipe 3 connects a washer tank 2 to the jet nozzle 1. A pump 4 is provided in the supply pipe 3 for applying pressure to the washer liquid supplied within the supply pipe 3. The pump 4 is mechanically connected to a driving motor 5. The driving motor 5 is electrically connected to a motor control circuit 6. A battery 12 is electrically connected to the motor control circuit 6 through an ignition switch 11 and an operation switch 10. The reference numeral 13 designates a wiper.

Figure 2:
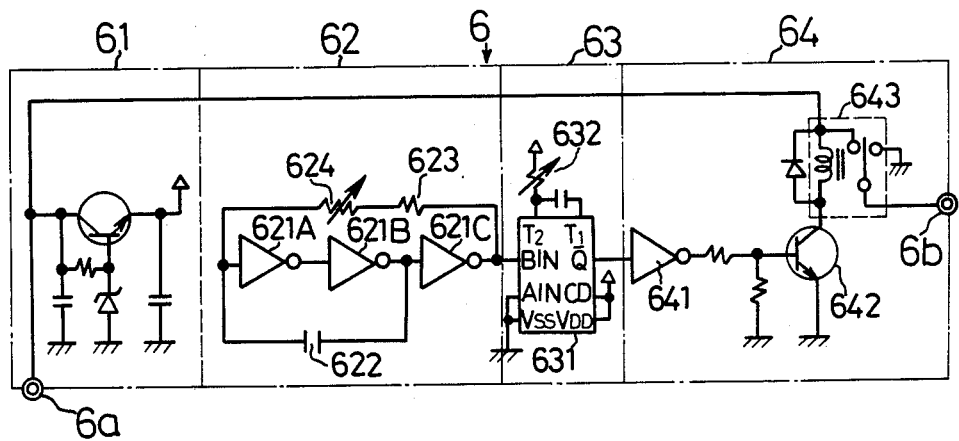
FIG. 2 is a circuit diagram of a motor control circuit used in a first embodiment of the present invention.

The motor control circuit 6 comprises a constant voltage power circuit 61, an oscillator circuit 62, a pulse width setting circuit 63 and an output circuit 64 as shown in FIG. 2. A terminal 6a is connected to the operation switch 10 shown in FIG. 1 while a terminal 6b is connected to the motor 5. The oscillator circuit 62 is composed of inverters 621A, 621B, 621C which are connected in series, a condenser 622, a resistor 623 and a variable resistor 624. The oscillation frequency of the oscillator circuit 62 is changed by means of the variable resistor 624.

The pulse width setting circuit 63 is composed of a monostable multivibrator 631. The pulse width of the pulse generated by the oscillator circuit 62 is set by the variable resistor 632.

The output circuit 64 is composed of an inverter 641, a transistor 642, and a relay 643. The transistor 642 is operated in accordance with the output pulse of the setting circuit 63 to apply a pulse-shaped voltage to the motor 5 through the relay 643.

The power circuit 61 supplies electric power to the above circuits 62, 63, 64.

Figure 3:
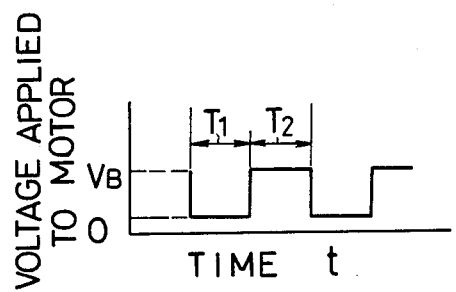
FIG. 3 is a wave form chart of a voltage applied to a driving motor in the first embodiment.

In operation, when the operation switch 10 is pushed after the ignition switch 11 is turned on, an electric current is supplied to the motor control circuit 6 from the battery 12. Then, a pulse-shaped battery voltage $V_B$ which is a square wave as shown in FIG. 3 is applied to the driving motor 5. The motor 5 is periodically accelerated or decelerated so that the discharge pressure of the pump 4 is changed.

As the delivery pressure of the pump 4 is changed, the jetting distance of the jet nozzle 1 is changed.

Figure 4:
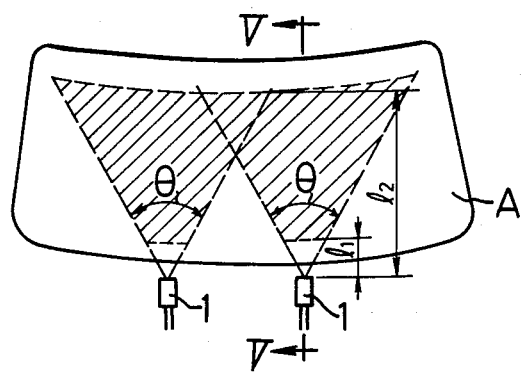
FIG. 4 is a front view of a windshield glass, illustrating the jetted area of a washer liquid.
Figure 5:
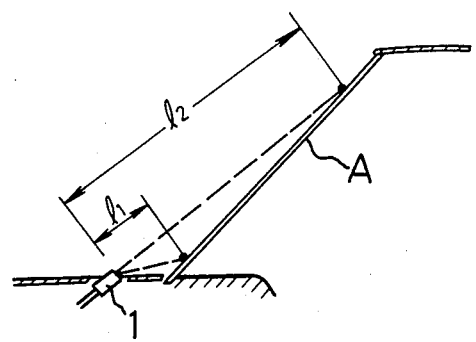
FIG. 5 is a sectional view taken along the line V—V of FIG. 4.

While the voltage $V_B$ is not applied to the motor 5 (for a period of time $T_1$ in FIG. 3), the speed of the motor 5 decreases to gradually decrease the discharge pressure of the pump 4. As a result, the jetting distance gradually decreases and at last reaches the minimum distance $l_1$ (FIGS. 4 and 5).

While the voltage $V_B$ is applied to the motor 5 (for a period of time $T_2$ in FIG. 3), the speed of the motor 5 increases to gradually increase the discharge pressure of the pump 4. As a result, the jetting distance of the washer liquid increases and at last reaches the maximum distance $l_2$.

Thus the jetting distance of the washer liquid is periodically changed in the vertical direction of the windshield glass from the distance $l_1$ to the distance $l_2$.

The jetted liquid is also periodically deflected leftwards and rightwards within a predetermined angle $\theta$ due to the self-oscillating operation of the jet nozzle 1.

Therefore, the jetted liquid can be uniformly spread over a wide range on the windshield glass which is shown by hatched lines in FIG. 4.

By operating the window washer in the above manner and operating the wiper 13 shown in FIG. 1, a stain or frost adhered to a wide area of the windshield glass A can be speedily removed.

Figure 6:
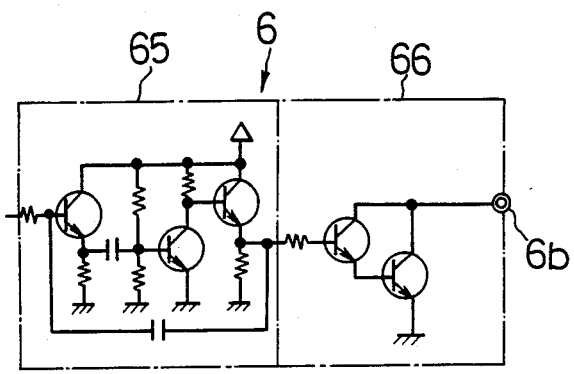
FIG. 6 is a circuit diagram of a motor control circuit in a second embodiment of the present invention.

The circuits shown in FIG. 6 can replace the regulating circuit 63 and the output circuit 64 shown in FIG. 2. In FIG. 6, a triangular wave generating circuit 65 is composed of a transistor, a resistor and a condenser. An output circuit 66 is composed of Darlington pair of open-collector transistors.

Figure 7:
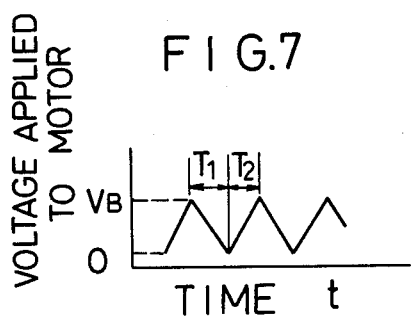
FIG. 7 is a wave form chart of a voltage applied to a driving motor in the second embodiment.

In this embodiment, the voltage applied to the motor 5 increases and decreases at a predetermined slope as shown in FIG. 7. The discharge pressure of the pump 4 also changes at a predetermined rate to continuously change the jetting distance of the washer liquid. Therefore, the washer liquid can be spread even more uniformly.

As described above, the present invention relates to a window washer having a fluidic oscillator jet nozzle which is directed to a windshield glass and jets a washer liquid thereagainst so as to periodically deflect the jetting direction leftwards and rightwards. According to the present invention, by periodically changing the pressure of the washer liquid to be supplied to the jet nozzle so as to change the liquid striking position on a windshield glass vertically, the washer liquid can be uniformly spread over a wide range on the windshield glass. Therefore, a stain or frost adhered to the windshield glass can be speedily removed by means of wiper blades.

The window washer of the present invention thus enables an increased windshield visibility over previously known devices, which unevenly distributed the washer liquid. Furthermore, since the jetted liquid reaches the whole wiper operating area on the windshield glass, scratches produced by sand, dirt or the like adhered to a dry glass surface can be prevented.

Since the washer liquid is spread uniformly, the window washer of the present invention does not require an excessive amount of washer liquid.

The window washer of the present invention can be realized by only adding a motor control circuit to a conventional window washer having a pump driven by a motor, for changing the discharge pressure of the pump by changing the speed of the motor.

What is claimed is:

1. A window washer comprising:
   a washer liquid jet nozzle comprising a fluidic oscillator provided on a vehicle body under a windshield glass for periodically deflecting the jetting direction of a washer liquid leftwards and rightwards;
   a washer liquid supply passage connecting a washer liquid tank to said fluidic oscillator for supplying said washer liquid to said fluidic oscillator; and
   pressure applying means provided in said washer liquid supply passage for periodically changing the pressure of said washer liquid supplied to said fluidic oscillator, said pressure applying means comprising a pump provided in said washer liquid supply passage for pumping said pressurized washer liquid; a driving motor for driving said pump; and a motor control circuit for periodically changing a voltatge to be applied to said driving motor.

2. A window washer according to claim 1, wherein said motor control circuit comprises an oscillator circuit for generating square wave pulses at predetermined intervals and an output circuit which applies the voltage to said motor while receiving said square wave pulses.

3. A window washer according to claim 2, wherein said motor control circuit further comprises a pulse width setting circuit for setting the pulse width of said square wave pulses.

4. A window washer according to claim 1, wherein said motor control circuit comprises a triangular wave generating circuit for periodically generating triangular wave pulses which increase and decrease at a predetermined slope; and an output circuit for changing the voltage applied to said motor at a predetermined rate in accordance with said triangular wave pulses.

* * * * *